United States Patent
Wang et al.

(10) Patent No.: US 9,341,721 B2
(45) Date of Patent: May 17, 2016

(54) CONCURRENT MULTI-SYSTEM SATELLITE NAVIGATION RECEIVER WITH REAL SIGNALING OUTPUT

(71) Applicant: QUALCOMM Incorporated, San Diego, CA (US)

(72) Inventors: Cheng-Han Wang, San Jose, CA (US); Hong Sun Kim, San Jose, CA (US); Liang Zhao, Sunnyvale, CA (US); Jin-Su Ko, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 531 days.

(21) Appl. No.: 13/841,698

(22) Filed: Mar. 15, 2013

(65) Prior Publication Data

US 2014/0266886 A1    Sep. 18, 2014

(51) Int. Cl.
*G01S 19/33* (2010.01)
*G01S 19/37* (2010.01)
*H04B 1/00* (2006.01)

(52) U.S. Cl.
CPC ............. *G01S 19/33* (2013.01); *G01S 19/37* (2013.01); *H04B 1/0067* (2013.01)

(58) Field of Classification Search
CPC ......... G01S 19/33; G01S 19/01; G01S 19/37; H04B 1/0067
USPC ........................... 342/357.73, 357.39
See application file for complete search history.

(56) References Cited

U.S. PATENT DOCUMENTS

| | | | |
|---|---|---|---|
| 6,678,340 B1 * | 1/2004 | Khlat | H03D 3/007 375/350 |
| 7,327,994 B2 | 2/2008 | Rafati | |

(Continued)

FOREIGN PATENT DOCUMENTS

| | | | | |
|---|---|---|---|---|
| EP | 1067674 A1 * | 1/2001 | ............. | H03D 3/007 |
| WO | 2011090498 A1 | 7/2011 | | |

OTHER PUBLICATIONS

International Preliminary Report on Patentability—PCT/US2014/019792, European Patent Office—Munich, Germany, Jul. 1, 2015, 20 pgs.

(Continued)

*Primary Examiner* — Harry Liu
(74) *Attorney, Agent, or Firm* — Hunter Clark PLLC

(57) ABSTRACT

A global navigation satellite system (GNSS) receiver includes at least one GNSS antenna configured to receive input signaling from at least a first GNSS source and a second GNSS source; an in-phase/quadrature (I/Q) mixer coupled to the at least one GNSS antenna and configured to process the input signaling to obtain complex intermediate signaling; a first complex filter coupled to the I/Q mixer and configured to filter the complex intermediate signaling with respect to a first frequency range to obtain first real output signaling; a second complex filter coupled to the I/Q mixer and configured to filter the complex intermediate signaling with respect to a second frequency range to obtain second real output signaling; and a signal combiner coupled to the first and second complex filters and configured to generate combined real output signaling by combining the first real output signaling and the second real output signaling.

42 Claims, 13 Drawing Sheets

(56) References Cited

U.S. PATENT DOCUMENTS

| | | | |
|---|---|---|---|
| 8,018,379 | B1 | 9/2011 | Sun et al. |
| 8,044,853 | B2 | 10/2011 | Zhao et al. |
| 8,229,031 | B2 | 7/2012 | Schmid |
| 8,587,477 | B2 | 11/2013 | Samavati et al. |
| 2009/0102546 | A1 | 4/2009 | Miyagi et al. |
| 2010/0119012 | A1* | 5/2010 | Pal .................. H04B 1/0039 375/324 |
| 2011/0057834 | A1 | 3/2011 | Miller |
| 2011/0115672 | A1 | 5/2011 | Lee |
| 2011/0128999 | A1* | 6/2011 | Ruegamer ............ G01S 19/13 375/147 |
| 2011/0181467 | A1 | 7/2011 | Samavati et al. |
| 2011/0181468 | A1 | 7/2011 | Sun et al. |
| 2012/0026039 | A1 | 2/2012 | Ganeshan et al. |
| 2013/0021934 | A1 | 1/2013 | Ruegamer et al. |
| 2014/0098839 | A1 | 4/2014 | Wang et al. |

OTHER PUBLICATIONS

Hossain, Maruf "Design of RF Front End for Multi-Band Multi-System GNSS Receivers," Masters Thesis Department of Electrical Engineering / Electronics, University of Gavle, Jan. 31, 2008, pp. i-63.

Second Written Opinion from International Application No. PCT/US2014/019792, dated Mar. 19, 2015, 8 pgs.

International Search Report and Written Opinion—PCT/US2014/019792—ISA/EPO—Jun. 23, 2014, 14 pages.

Rugamer A., et al., "An integrated overlay architecture based multi-GNSS front-end", Position Location and Navigation Symposium (PLANS), 2012 IEEE/ION, IEEE, Apr. 23, 2012, pp. 50-59, XP032200213, DOI: 10.11 09/PLANS.2012.6236864 ISBN : 978-1-4673-0385-9.

* cited by examiner

CONCURRENT MULTI-SYSTEM SATELLITE NAVIGATION RECEIVER WITH REAL SIGNALING OUTPUT

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

Various applications are configured to locate and utilize the position of a wireless communication device. For instance, location based services (LBSs) leverage the location of an associated device to provide controls for one or more applications running on the device. Applications of LBS functionality implemented with respect to wireless communication devices include personal navigation, social networking, targeting of content (e.g., advertisements, search results, etc.), among others. The location of a mobile device is estimated using various techniques. An estimated position of a device may be calculated based on signals from transmitters of one or more communication systems, such as global satellite navigation systems (GNSSs) or other satellite positioning systems (SPSs), terrestrial positioning systems such as cellular telephone networks or other wireless data systems, etc. To enhance accuracy of these calculations, a device may be capable of obtaining and using signals from multiple communication systems for a position estimate.

SUMMARY

An example of a method for processing GNSS signals includes: receiving input signaling from at least a first GNSS source and a second GNSS source; processing the input signaling via an in-phase (I)/quadrature (Q) mixer to obtain complex intermediate signaling; filtering the complex intermediate signaling via a first complex filter associated with a first frequency range and a second complex filter associated with a second frequency range, thereby obtaining first real output signaling and second real output signaling, respectively; and generating combined real output signaling by combining the first real output signaling and the second real output signaling.

Implementations of the method may include one or more of the following features. The method further includes providing the combined real output signaling to a baseband signal processor. Providing the combined real output signaling to the baseband signal processor includes providing the combined real output signaling to an analog to digital converter (ADC) of the baseband signal processor. The first frequency range includes a frequency range on which the input signaling is received from the first GNSS source and the second frequency range includes a frequency range on which the input signaling is received from the second GNSS source. The first frequency range and the second frequency range are situated on opposite sides of a system baseband frequency and are not imaged to each other. The filtering includes providing at least a first level of rejection at the second frequency range and an opposite of the second frequency range with respect to the system baseband frequency via the first complex filter; and providing at least a second level of rejection at the first frequency range and an opposite of the first frequency range with respect to the system baseband frequency via the second complex filter. The method further includes defining the first and second levels of rejection such that overlap between outputs of the first and second complex filters in frequency is no more than a threshold, and the threshold is chosen as a function of a desired filter output signal quality. The filtering includes configuring the first complex filter and the second complex filter to operate at a local oscillator (LO) frequency, and the LO frequency is chosen such that a frequency response of respective outputs of the first and second complex filters do not overlap at the system baseband frequency.

Also or alternatively, implementations of the method may include one or more of the following features. The combining includes combining the first real output signaling and the second real output signaling in current to obtain combined current signaling. The method further includes converting the combined current signaling to voltage signaling via a transimpedance amplifier (TIA). The combining includes combining the first real output signaling and the second real output signaling to obtain differential output signaling; and converting the differential output signaling to single-ended output signaling. The first GNSS source is associated with a first communication technology and the second GNSS source is associated with a second communication technology. The first communication technology includes Global Positioning System (GPS) and the second communication technology includes Glonass. The first GNSS source is associated with a first frequency band and the second GNSS source is associated with a second frequency band. The first frequency band includes an L1 frequency band and the second frequency band includes an L2 frequency band.

An example of a concurrent multi-system GNSS receiver includes: at least one GNSS antenna configured to receive input signaling from at least a first GNSS source and a second GNSS source; an I/Q mixer communicatively coupled to the at least one GNSS antenna and configured to process the input signaling to obtain complex intermediate signaling; a first complex filter communicatively coupled to the I/Q mixer and configured to filter the complex intermediate signaling with respect to a first frequency range to obtain first real output signaling; a second complex filter communicatively coupled to the I/Q mixer and configured to filter the complex intermediate signaling with respect to a second frequency range to obtain second real output signaling; and a signal combiner communicatively coupled to the first complex filter and the second complex filter and configured to generate combined real output signaling by combining the first real output signaling and the second real output signaling.

Implementations of the receiver may include one or more of the following features. The signal combiner is communicatively coupled to a baseband signal processor and configured to provide the combined real output signaling to the baseband signal processor. The first frequency range includes a frequency range on which the input signaling is received from the first GNSS source and the second frequency range includes a frequency range on which the input signaling is received from the second GNSS source. The first frequency range and the second frequency range are situated on opposite sides of a system baseband frequency and are not imaged to each other. The first complex filter is configured to provide at least a first level of rejection at the second frequency range and an opposite of the second frequency range with respect to the system baseband frequency; and the second complex filter is configured to provide at least a second level of rejection at the first frequency range and an opposite of the first frequency range with respect to the system baseband frequency. The first and second levels of rejection are defined such that overlap between outputs of the first and second complex filters in frequency is no more than a threshold, wherein the threshold is chosen as a function of a desired filter output signal quality. The first complex filter and the second complex filter are configured to operate with respect to an LO frequency, and the LO frequency is chosen such that a frequency response of respective outputs of the first and second complex filters do not overlap at the system baseband frequency.

Also or alternatively, implementations of the receiver may include one or more of the following features. The signal combiner is further configured to generate combined output current signaling by combining the first real output signaling and the second real output signaling. The receiver further includes a TIA communicatively coupled to the signal combiner and configured to convert the combined output current signaling to combined output voltage signaling. The signal combiner is further configured to generate differential output signaling by combining the first real output signaling and the second real output signaling; and the receiver further includes a conversion stage communicatively coupled to the signal combiner and configured to convert the differential output signaling to single-ended output signaling. The differential output signaling is a differential current signal; the receiver further includes a TIA communicatively coupled to the signal combiner and configured to convert the differential current signal to a differential voltage signal; and the conversion stage includes a voltage converter configured to convert the differential voltage signal into a single-ended voltage signal. The differential output signaling is a differential current signal; and the conversion stage includes a current combiner configured to convert the differential current signal into a single-ended current signal.

Also or alternatively, implementations of the receiver may include one or more of the following features. The first GNSS source is associated with a first communication technology and the second GNSS source is associated with a second communication technology. The first GNSS source is associated with a first frequency band and the second GNSS source is associated with a second frequency band.

An example of an apparatus for receiving GNSS signals includes: at least one GNSS antenna configured to receive input signaling from at least a first GNSS source and a second GNSS source; an I/Q mixer communicatively coupled to the at least one GNSS antenna and configured to process the input signaling to obtain complex intermediate signaling; filter means, communicatively coupled to the I/Q mixer, for filtering the complex intermediate signaling with respect to a first frequency range and a second frequency range, thereby generating first real output signaling and second real output signaling, respectively; and combiner means, communicatively coupled to the filter means, for generating combined real output signaling by combining the first real output signaling and the second real output signaling.

Implementations of the apparatus may include one or more of the following features. The combiner means is communicatively coupled to a baseband signal processor and includes means for providing the combined real output signaling to the baseband signal processor. The first frequency range includes a frequency range on which the input signaling is received from the first GNSS source and the second frequency range includes a frequency range on which the input signaling is received from the second GNSS source. The first frequency range and the second frequency range are situated on opposite sides of a system baseband frequency and are not imaged to each other. The filter means includes means for generating the first real output signaling by providing at least a first level of rejection at the second frequency range and an opposite of the second frequency range with respect to the system baseband frequency; and means for generating the second real output signaling by providing at least a second level of rejection at the first frequency range and an opposite of the first frequency range with respect to the system baseband frequency. The first and second levels of rejection are defined such that overlap between outputs of the first and second complex filters in frequency is no more than a threshold, wherein the threshold is chosen as a function of a desired filter output signal quality. The filter means operates with respect to an LO frequency, and the LO frequency is chosen such that a frequency response of respective outputs of the means for generating the first real output signaling and the means for generating the second real output signaling do not overlap at the system baseband frequency.

Also or alternatively, implementations of the apparatus may include one or more of the following features. The filter means includes a first complex filter and a second complex filter, the first complex filter is configured to generate the first real output signaling, and the second complex filter is configured to generate the second real output signaling. The combined real output signaling includes output current signaling. The apparatus further includes a TIA communicatively coupled to the combiner means and configured to convert the output current signaling to voltage signaling. The combiner means includes means for combining the first real output signaling and the second real output signaling to obtain differential output signaling; and means for converting the differential output signaling to single-ended output signaling. The first GNSS source is associated with a first communication technology and the second GNSS source is associated with a second communication technology. The first GNSS source is associated with a first frequency band and the second GNSS source is associated with a second frequency band.

Items and/or techniques described herein may provide one or more of the following capabilities, as well as other capabilities not mentioned. Signals received from multiple signal sources are provided as a combined real signal, resulting in reduced pin counts associated with a receiver in comparison to receivers that output complex signaling. Further, received signals can be processed at baseband using a single analog to digital converter (ADC) as a result of the real signal combining described herein, thereby reducing overall circuit size and increasing efficiency. Generally, the systems and methods herein result in the ability to produce smaller, more compact mobile communication components and devices. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Described herein are systems and methods for implementing concurrent multi-system receivers, such as GNSS receivers, with real signaling output capability. Multi-system GNSS receivers filter and process received signals from multiple systems such as Global Positioning System (GPS), Glonass, Beidou, etc., and provide the corresponding GNSS information to a baseband digital processor in the form of a complex signal. The complex signal consists of an in-phase (I) component and a quadrature (Q) component, each occupying two pins of the receiver in the case of differential signaling or one pin in the case of single-ended signaling. Techniques and architectures described herein provide for real (i.e., non-complex) signaling output for a communications receiver such as a GNSS receiver. This enables the receiver to provide received information to baseband via only one of the I signal or Q signal, reducing the overall pin count and enabling smaller, more compact and more efficient systems.

Figure 1:
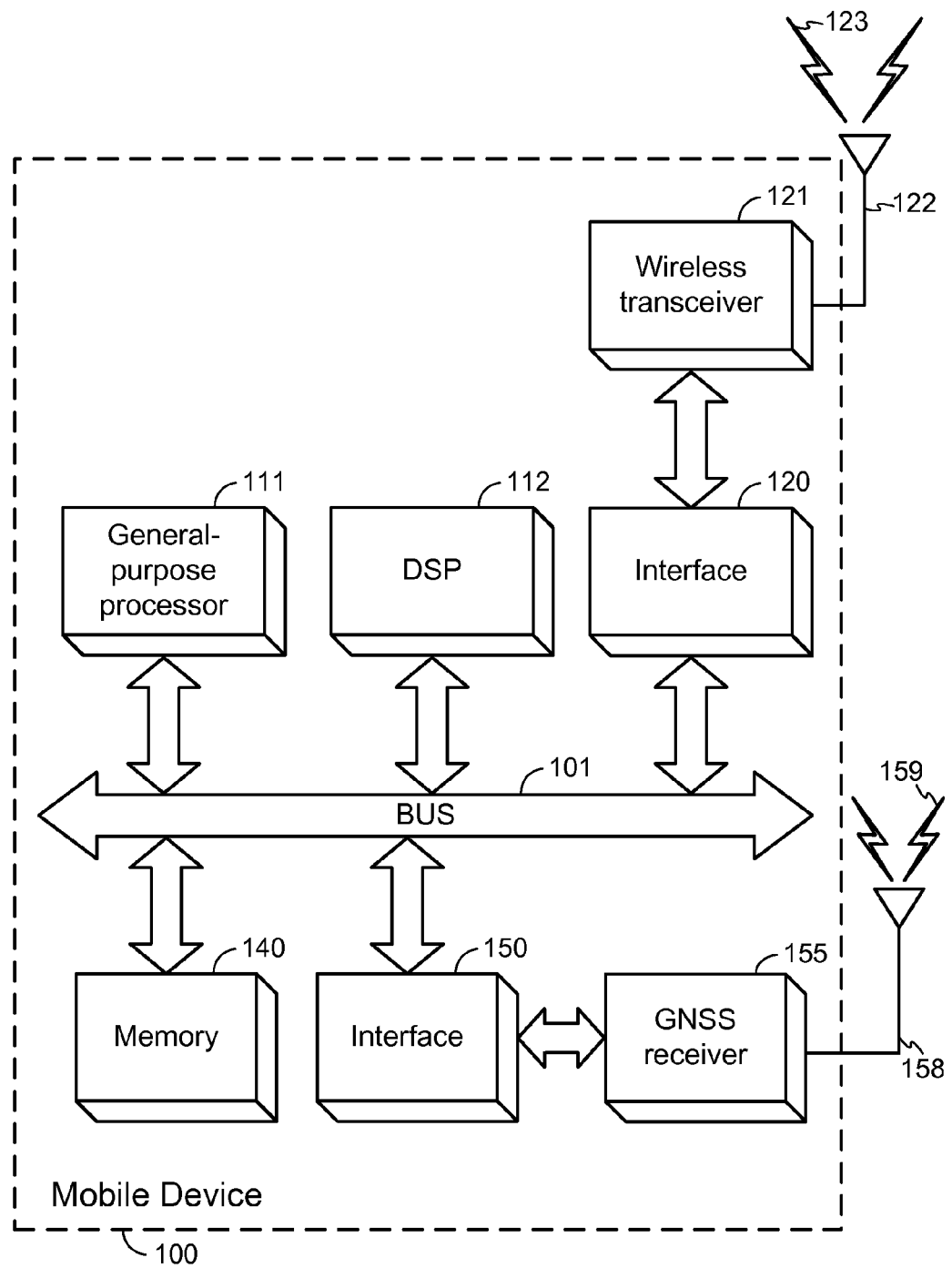
FIG. 1 is a block diagram of components of a mobile station.

Systems and methods described herein operate via one or more mobile devices, such as mobile device 100 shown in FIG. 1. The mobile device 100 may be, or may implement the functionality of, a personal digital assistants (PDA), smartphone, computing device such as a laptop, desktop or tablet computer, automobile computing system, and/or any other communication device either presently existing or developed in the future.

The mobile device 100 includes a wireless transceiver 121 that sends and receives wireless signals 123 via a wireless antenna 122 over a wireless network. The transceiver 121 is connected to a bus 101 by a wireless transceiver bus interface 120. While shown as distinct components in FIG. 1, the wireless transceiver bus interface 120 may also be a part of the wireless transceiver 121. Here, the mobile device 100 is illustrated as having a single wireless transceiver 121. However, a mobile device 100 can alternatively have multiple wireless transceivers 121 and wireless antennas 122 to support multiple communication standards such as Wi-Fi, Code Division Multiple Access (CDMA), Wideband CDMA (WCDMA), Long Term Evolution (LTE), Bluetooth, etc.

A general-purpose processor 111, memory 140, digital signal processor (DSP) 112 and/or specialized processor(s) (not shown) may also be utilized to process the wireless signals 123 in whole or in part. Storage of information from the wireless signals 123 is performed using a memory 140 or registers (not shown). While only one general purpose processor 111, DSP 112 and memory 140 are shown in FIG. 1, more than one of any of these components could be used by the mobile device 100. The general purpose processor 111, DSP 112 and memory 140 are connected to the bus 101.

The mobile device 100 also includes a GNSS receiver 155 that receives GNSS signals 159 via a GNSS antenna 158. The GNSS signals 159 are received from GNSS satellites or other sources. The GNSS satellites can be associated with a single GNSS or multiple such systems. Examples of a GNSS that can be utilized by the mobile device 100 include, but are not limited to, GPS, Galileo, Glonass, Beidou (Compass), etc. The GNSS receiver 155 processes, in whole or in part, the GNSS signals 159 and uses these GNSS signals 159 to determine the location of the mobile device 100. Example techniques by which the GNSS receiver 155 can process GNSS signals 159 from one or more systems are described in further detail below. Additionally, the general-purpose processor 111, memory 140, DSP 112 and/or specialized processor(s) (not shown) may also be utilized to assist in processing the GNSS signals 159 and/or calculating the location of the mobile device 100. Storage of information from the GNSS signals 159 or other location signals is performed using a memory 140 or registers (not shown).

The memory 140 includes a non-transitory computer-readable storage medium (or media) that stores functions as one or more instructions or code. Media that can make up the memory 140 include, but are not limited to, RAM, ROM, FLASH, disc drives, etc. Functions stored by the memory 140 are executed by the general-purpose processor 111, specialized processor(s), or DSP 112. Thus, the memory 140 is a processor-readable memory and/or a computer-readable memory that stores software 170 (programming code, instructions, etc.) configured to cause the processor 111 and/or DSP 112 to perform the functions described. Alternatively, one or more functions of the mobile device 100 may be performed in whole or in part in hardware.

As technology associated with mobile devices has advanced, e.g., with sub-65 nm manufacturing and wafer-level scale packaging and other similar advancements, pin scarcity has become an increasing area of interest and is expected to become more of an area of interest in the future. Currently in a non-system on a chip (SOC) platform, both the I and Q intermediate frequency (IF)/baseband (BB) signals are sent to a BB digital processor. Architectures herein are described that enable only one of the I-channel signal or Q-channel signal to the BB digital processor. By selectively controlling the baseband and/or local oscillator (LO) frequency, frequency bands corresponding to signals from different systems are prevented from overlapping. Due to the real-signal architecture and to prevent jammer de-sensing, one complex filter is provided for each system for which signals are received. These filters provide rejection at the frequency bands' respective image frequencies. Subsequently, the two complex filter outputs are combined, e.g., either through a trans-impedance amplifier (TIA) for voltage signaling or a current buffer (CB) for current signaling. The combined signal is sent to an ADC for further processing. These preceding operations are illustrated and discussed in further detail below.

Examples of a concurrent multi-system communications receiver with real signaling output are described below. Various examples are given for the case of a GNSS receiver that receives and processes signals from a GPS system and a Glonass system. However, these examples are intended as non-limiting and other systems and/or access technologies could also be used.

Figure 2:
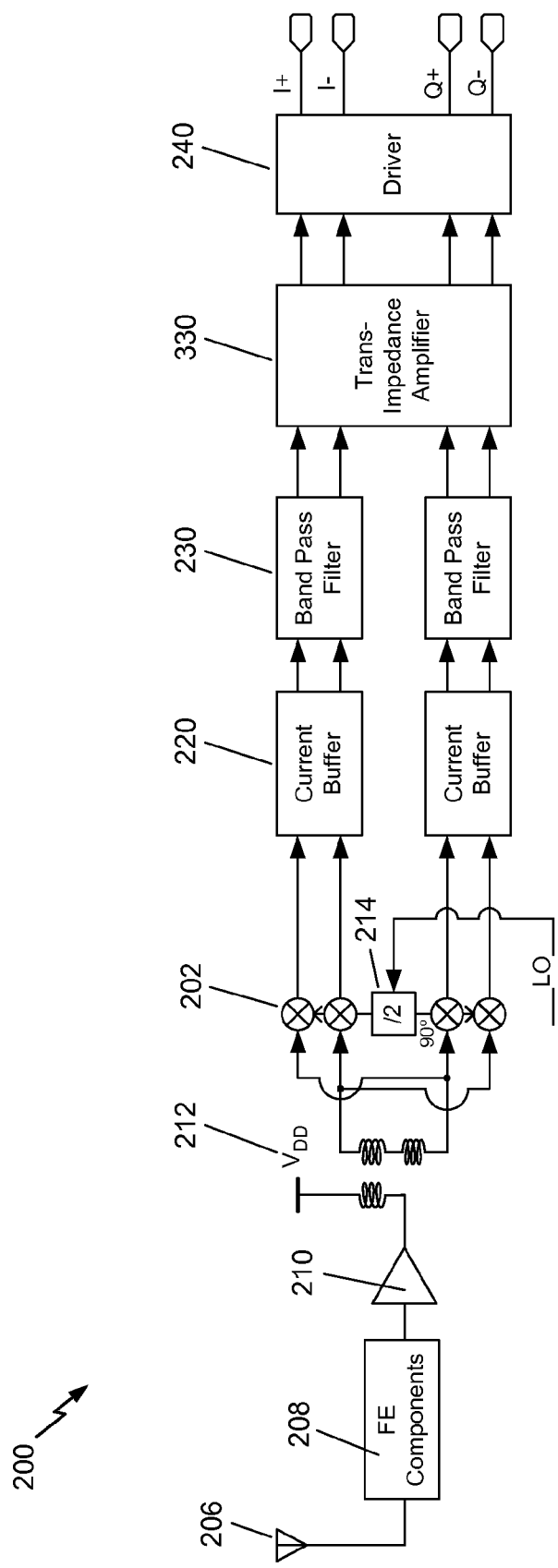
FIG. 2 is a block diagram of a GNSS receiver.

FIG. 2 shows an implementation of a GNSS receiver 200 that includes an antenna 206, Front-End (FE) Components 208, a Low Noise Amplifier (LNA) 210, a Balun 212, an I/Q mixer 202 with Quadrature Local Oscillator (LO) Clock 214, a current buffer (CB) 220, a trans-impedance amplifier (TIA) 330 and band-pass filter 230, and a driver 240. While the driver 240 and TIA 330 are illustrated separately, the driver 240 may be merged into the TIA 330 as a single entity. As shown, signals are received from two communication systems, here a first GNSS (GPS) and a second GNSS (Glonass). The obtained input signals are processed via the I/Q mixer 202 to obtain a combined complex signal with an I component and a Q component that corresponds to both systems. The signals are additionally processed via the current buffer 220 in order to buffer the signal and/or otherwise adjust the signal for subsequent processing by other components of the receiver 200. Upon processing by the current buffer 220, a band-pass filter 230 is utilized to obtain a filtered complex I/Q signal. Each of the I and Q components of this filtered signal is separately provided to the driver 240 for further processing at baseband.

Figure 3:
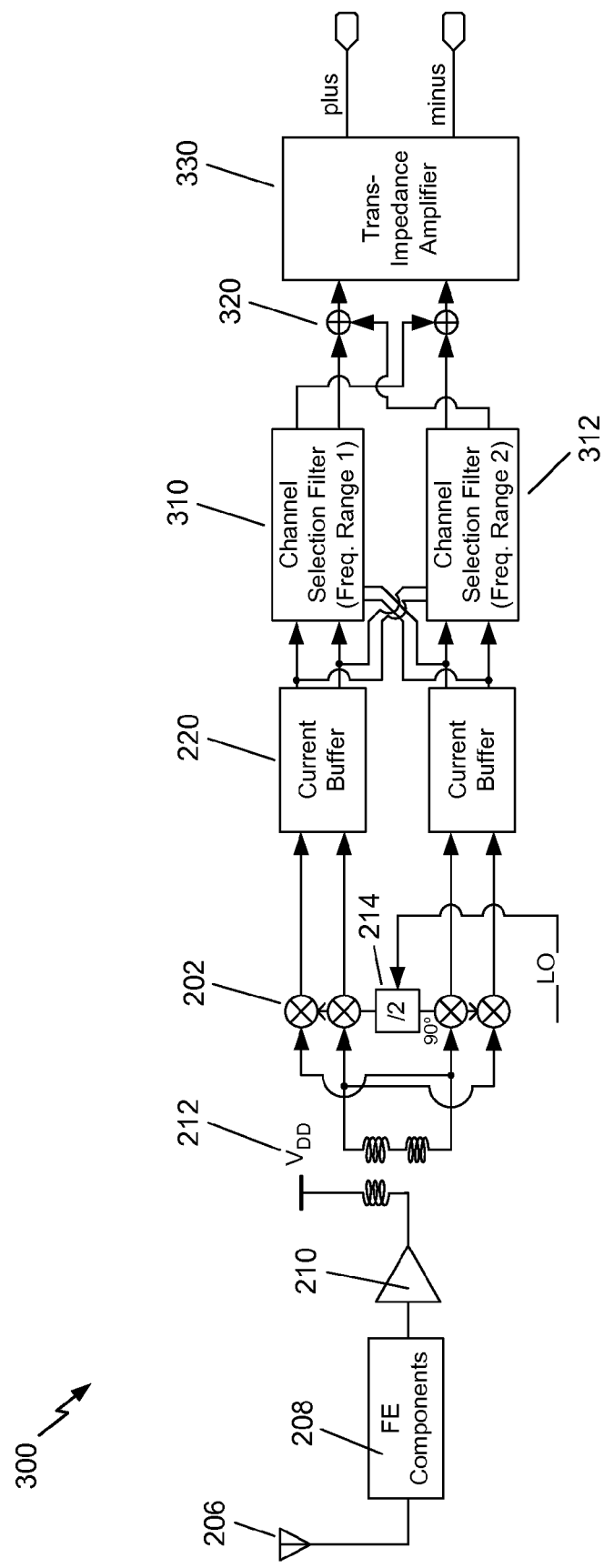
FIGS. 3-6 are block diagrams of respective embodiments of a concurrent multi-system communications receiver that provides real signaling output.

FIG. 3 shows an example of an improved architecture for a multi-system receiver 300 as described herein. In the receiver 300, an input signal received from multiple distinct sources (e.g., different communications systems, frequency bands or ranges, etc.) via an antenna 206, FE components 208, LNA 210, and Balun 212 as shown above with respect to FIG. 2 are processed via the FQ mixer 202 and current buffer 220, as further described above with respect to the receiver 200. Next, the resulting complex signal is passed to separate complex channel selection filters 310, 312 to separate the signals received from the respective systems and/or other sources associated with the receiver 300. The complex filters 310, 312 are associated with frequency ranges on which signaling is received from their respectively associated sources (e.g., systems, frequency bands, etc.) and are configured to filter the complex signal given by the current buffer 220 with respect to these frequency ranges, as described in further detail below. The result of the filters 310, 312 are real-domain signals corresponding to each system. These resulting real signals are then combined through a signal combiner 320. Here, the signal combiner 320 produces a combined current signal, which is converted back to voltage through the TIA 330. Subsequently, the resulting real-domain voltage signal is provided to baseband. By utilizing complex filters 310, 312 corresponding to each associated system and combining real signal outputs as shown in FIG. 3, two pins are utilized to convey received signals to the baseband digital processor, thereby providing pin savings over the receiver 200 shown in FIG. 2 that utilizes a single band-pass filter 230 without signal combining. The signal combiner 320 may include, or implement the functionality of, one or more of a TIA (e.g., for voltage signaling input and current signaling output), a voltage amplifier (e.g., for voltage signaling input and output), a current buffer (e.g., for current signaling input and output), etc. Further, one or more amplifiers, buffers, and/or entities may be utilized in addition to the signal combiner 320 to further process the combined signal prior to the combined signal being provided to baseband.

Figure 4:
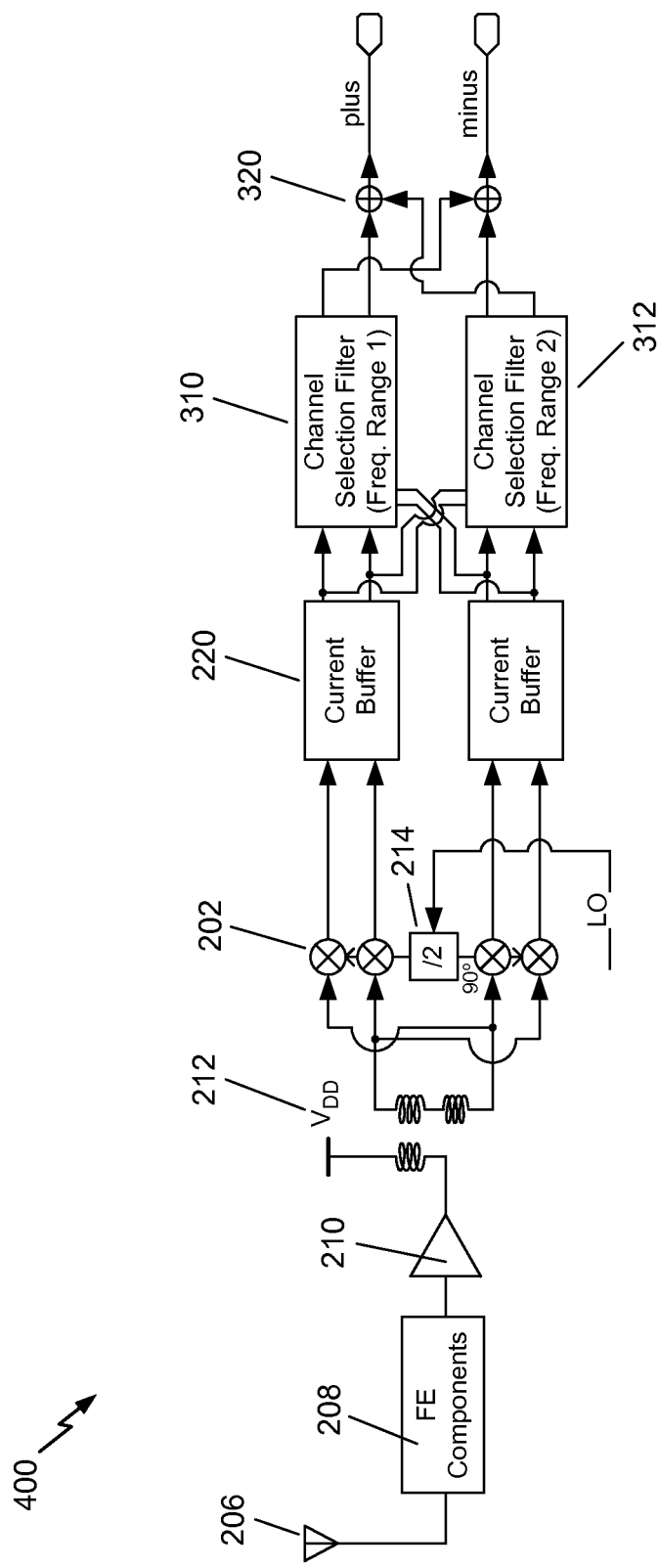

FIG. 4 shows another receiver 400 that can be utilized for providing real-domain output signals to baseband. As shown in FIG. 4, the receiver 400 is similar in design to the receiver 300 shown in FIG. 3. In contrast to the receiver 300, however, the receiver 400 shown in FIG. 4 provides the current signal obtained from the signal combiner 320 directly to the baseband ADC without a voltage conversion via the TIA 330 as shown in FIG. 3.

Figure 5:
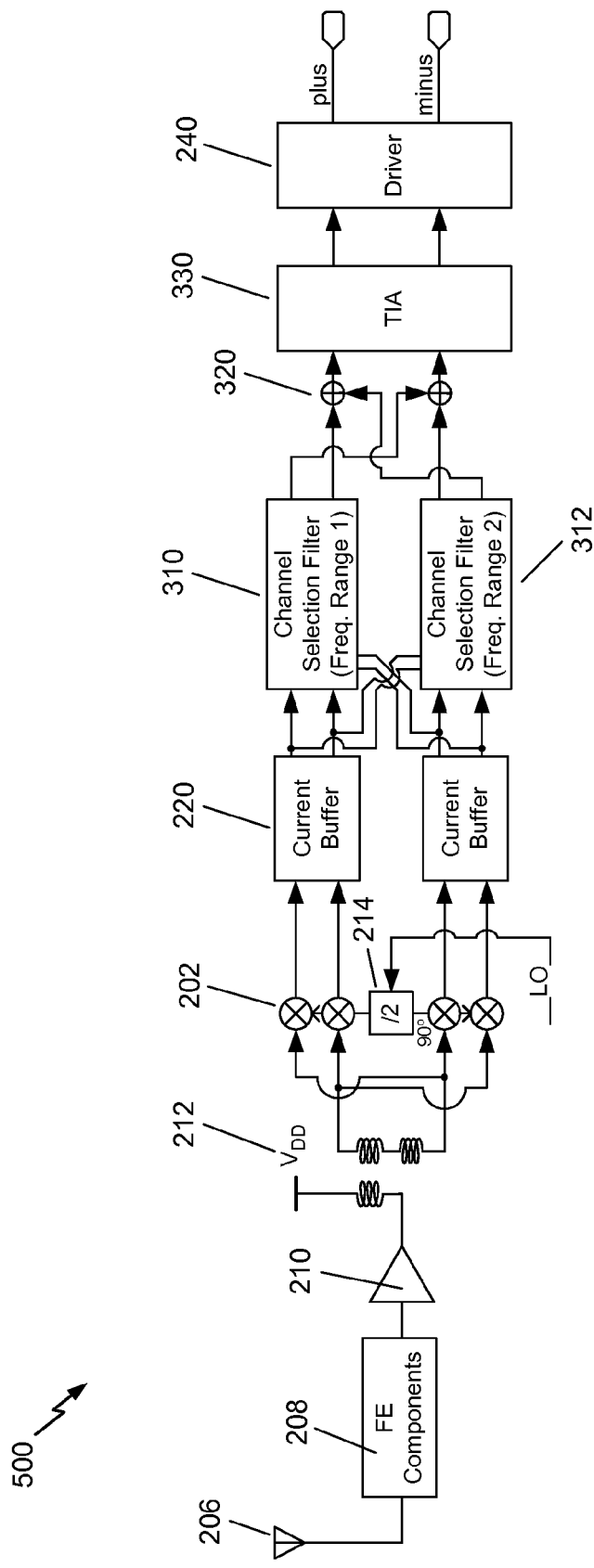

FIG. 5 shows an additional example of a receiver 500 that provides real-domain output signaling to baseband in a similar manner to receiver 300 shown in FIG. 3. In contrast to the receiver 300 of FIG. 3, the receiver 500 utilizes separate TIA 330 and driver 240 stages prior to conveying the output signaling to the baseband ADC.

Figure 6:
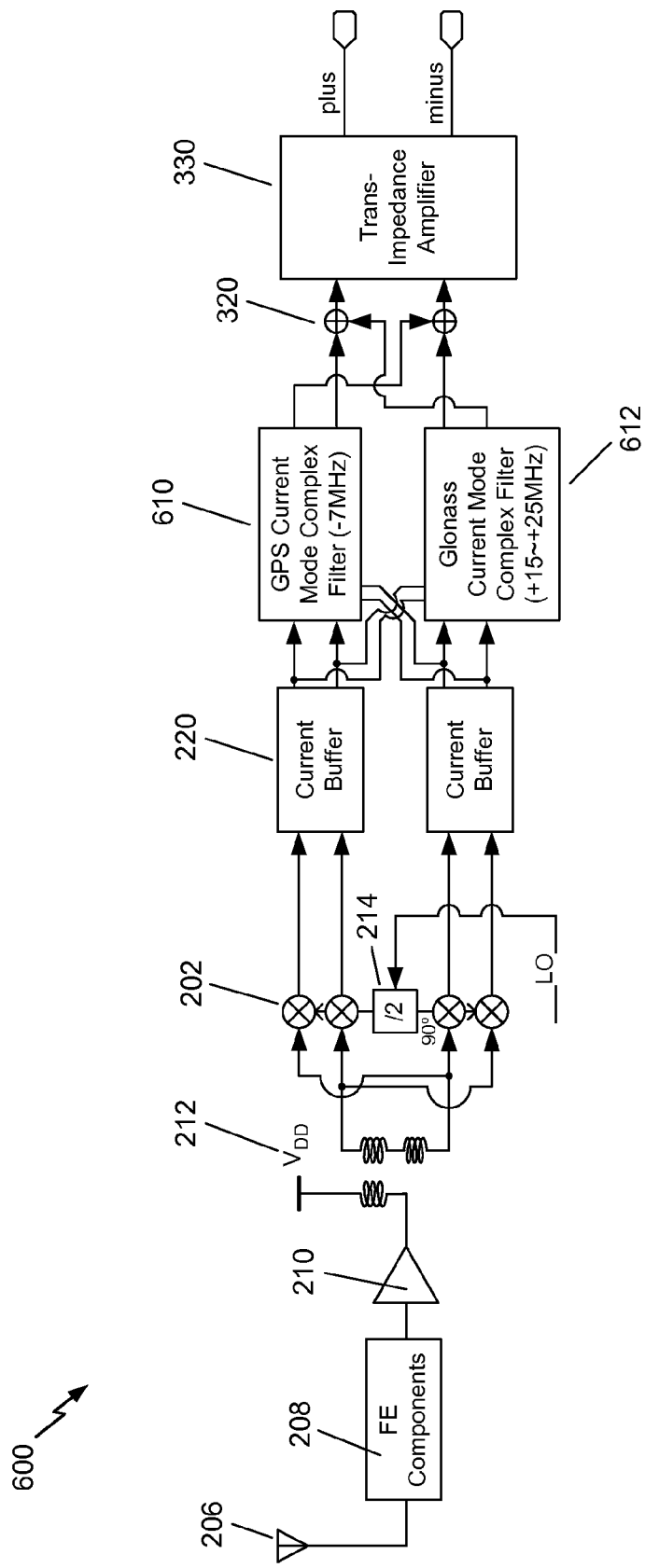

With respect to the complex filters 310, 312 shown in the context of the receivers 300, 400, 500, a LO frequency is chosen for use by the complex filters 310, 312 such that the frequency response of the respective outputs of the complex filters 310, 312 do not overlap at the system baseband frequency. Selection of a LO frequency and operation of the complex filters is illustrated for an example of a multi-system GNSS receiver 600 in FIG. 6, which processes signals from a GPS source and a Glonass source. The GNSS receiver 600 includes an antenna 206, FE components 208, LNA 210, Balun 212, FQ mixer 202 with LO clock 214, and current buffer 220, each of which operate as described above. The GPS and Glonass components of the received input signal are then obtained from the resulting complex signal at complex filters 610 and 612, respectively, before being combined by the signal combiner 320 and converted to a voltage signal by a TIA 330 in a similar manner to that described above with respect to FIG. 3. Alternatively, the outputs of the complex filters 610, 612 could be passed to a signal combiner 320 only as shown in FIG. 4, to a signal combiner 320 and separate TIA 330 and driver 240 as shown in FIG. 5, or any other suitable output stage component(s).

Examples of baseband frequency response functions that are utilized by the GNSS receiver 600 in processing GPS and Glonass signals are shown in FIGS. 7, 8A-B, 9 and 10A-B. Signals from other sources could also be similarly processed. In each case shown in the following figures, complex filtering is used for both the GPS and Glonass bands.

Figure 7:
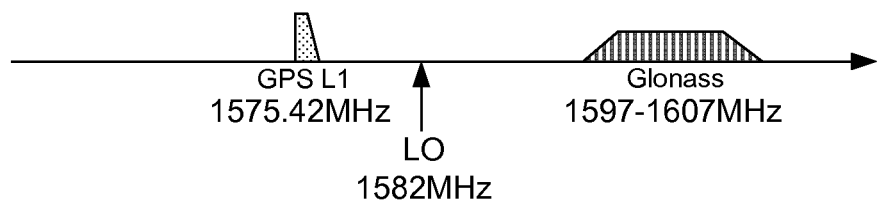
FIGS. 7, 8A-B, 9 and 10A-B are diagrams illustrating example communication frequency ranges for which processing is conducted by the multi-system receiver shown in FIG. 3.

Referring first to FIG. 7, a representation of L1-band GPS and Glonass antenna input signal spectrums is shown. The GPS L1-band signal occupies a frequency range centered at approximately 1575.42 MHz, while the Glonass L1-band signal occupies a frequency range from approximately 1597 MHz to approximately 1607 MHz. A desired frequency response is achieved by modifying one or more features of the respective filters 610, 612 and/or by setting the LO frequency. For the example shown in FIG. 7, a LO frequency of 1582 MHz is selected such that the GPS filter output frequency is approximately −7 MHz relative to the LO while the Glonass output frequency ranges from approximately 15-25 MHz relative to the LO. The filters 610, 612 are configured such that sufficient rejection, here at least a rejection of approximately 20 dB, is provided at the opposite of the other filter's output frequency with respect to the baseband and/or LO frequencies such that the performance loss associated with the filter outputs being imaged to one another is negligible. This rejection is shown in FIG. 8A, and is referred to herein as the rejection threshold(s) of the receiver.

Figure 8A:
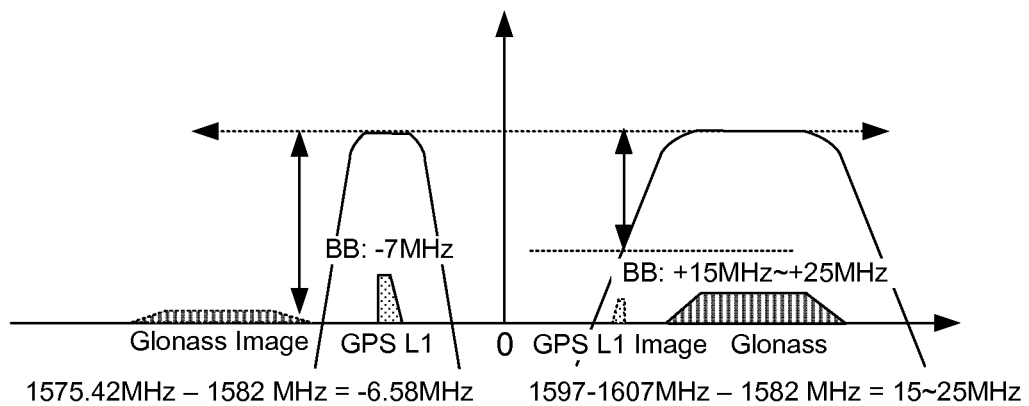
Figure 8B:
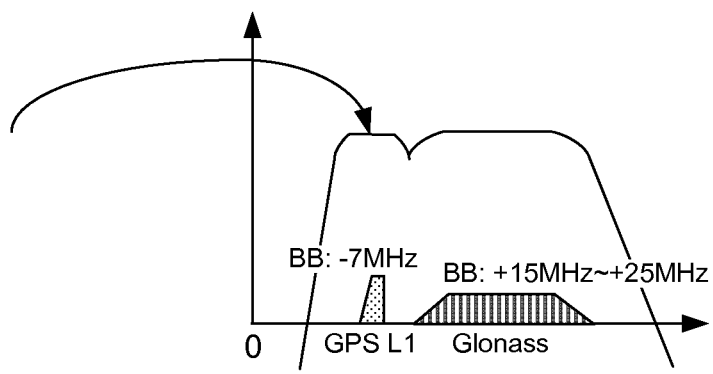

FIG. 8A illustrates the complex domain spectrums for the L1 GPS and Glonass signals prior to signal combining. Here, the GPS filter 610 provides rejection as described above at approximately −15 to −25 MHz relative to baseband while the Glonass filter 612 provides similar rejection at approximately +7 MHz relative to baseband. The differing output frequencies at which the complex filters 610, 612 operate, in addition to their image frequency rejection properties, enables the outputs of the two filters to be combined in the analog domain. The real-domain signal spectrum resulting from the complex filters 610, 612 in the L1-band case is shown in FIG. 8B.

Figure 9:
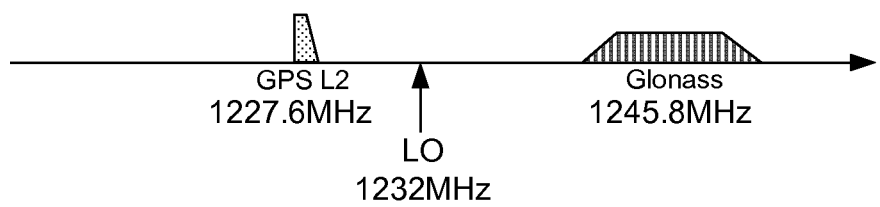
Figure 10A:
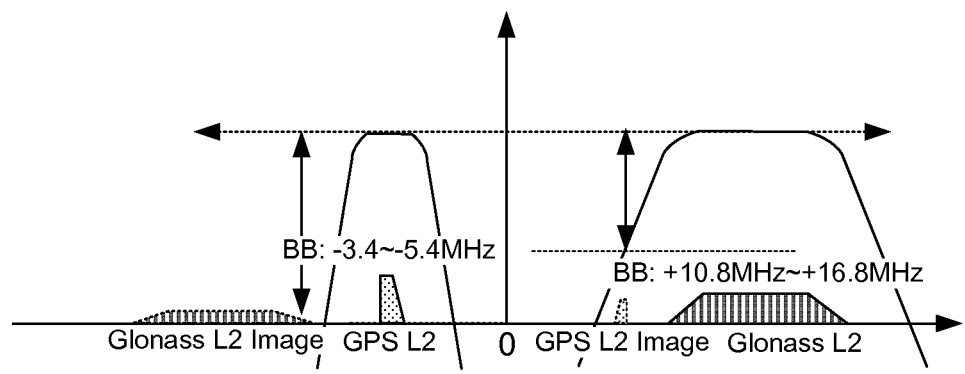
Figure 10B:
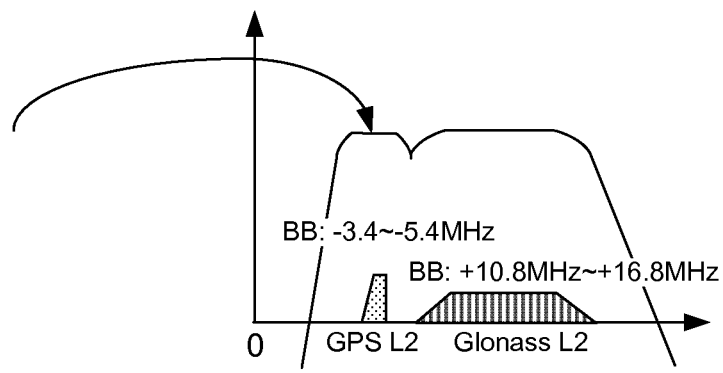

FIG. 9 shows a representation of L2-band GPS and Glonass antenna input signal spectrums. Here, the GPS L2-band signal occupies a frequency range centered at approximately 1227.6 MHz, while the Glonass L2-band signal occupies a frequency range centered at approximately 1245.8 MHz. As shown in FIG. 10A, a desired frequency response is achieved via the complex filters 610, 612 in a similar manner to that shown by FIGS. 8A-B by modifying one or more features of the respective filters 610, 612 and/or by setting the LO frequency. Here, the LO is set to a frequency of 1232 MHz, causing the GPS filter output to be approximately −3.4 to −5.4 MHz relative to baseband and causing the Glonass filter output to be approximately +10.8 to +16.8 MHz relative to baseband. The filters 610, 612 are configured for the L2-band case to provide similar rejection (e.g., relative to the receiver rejection threshold(s)) to that described for the L1-band case at the opposite of the other filter's output frequency with respect to the baseband and/or LO frequencies. Here, the GPS filter 610 is configured to provide at least approximately 20 dB rejection at +5.4 MHz relative to baseband and the Glonass filter 612 is configured to provide at least 20 dB rejection at −10.8 MHz relative to baseband, although other configurations could also be used. The resulting real-domain signal spectrum of the complex filters 610, 612 for the L2-band case is shown by FIG. 10B.

Returning to FIG. 3, the real output signals of the complex filters 310, 312, are combined in the analog domain. Here, the outputs of the complex filters 310, 312 are current signals, and the TIA 330 converts the outputs of the complex filters (as combined via the signal combiner 320) to a voltage signal such that the voltage signal is provided to baseband for further processing. Other implementations are also possible. For instance, the outputs of the complex filters 310, 312 could alternatively be voltage symbols, for which a voltage amplifier and/or other components could be used in place of the TIA 330.

As a result of the combining via the signal combiner 320, the combined output of both filters 310, 312 is provided to a single analog to digital converter (ADC) at baseband via a single signal source. In general, by processing received information via separate complex filters for respective systems and combining the resulting filter outputs, the architecture of the invention provides a real signaling output, in contrast to complex signaling output as shown in FIG. 2. In turn, reduced circuit space associated with baseband processing, smaller pin counts, and other benefits are realized as described above.

As additionally shown in FIG. 3, the signals obtained from the respective input sources are processed through the receiver 300 using differential signaling, wherein each signal is conveyed between the components of the receiver 300 using a differential pair connection. The differential pair corresponding to each signal includes complementary signal components, e.g., a positive component and a negative component. Alternatively, the obtained signals may be conveyed through the receiver 300 using single-ended (SE) signaling, wherein a single bit connector carries the signal with respect to a reference, e.g., ground or a common voltage. The common voltage for a single-ended receiver can be shared between multiple components of an associated device including the receiver 300, baseband processing components, and/or other entities, thereby enabling increased pin savings.

Figure 11:
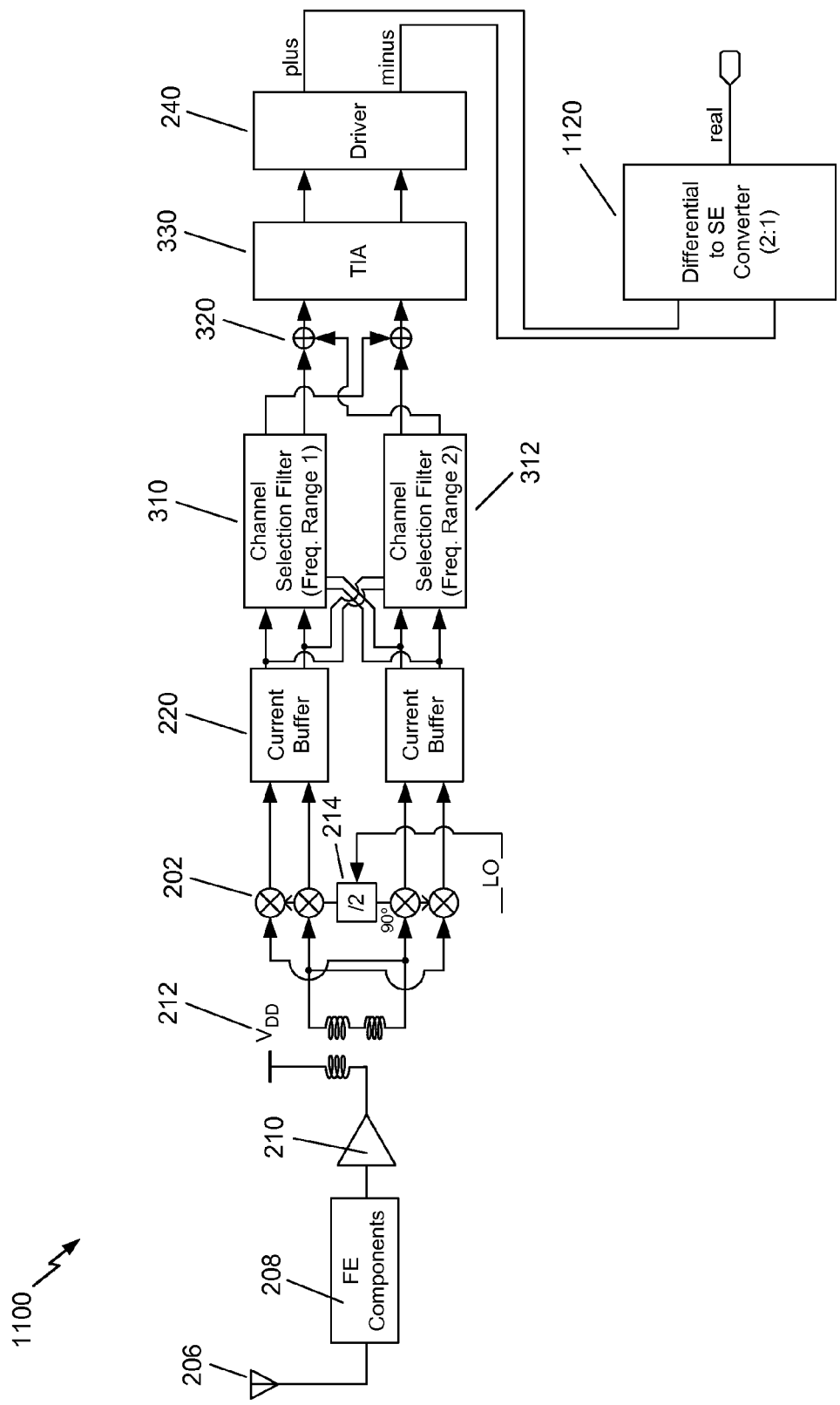
FIGS. 11-12 are block diagrams of respective embodiments of a concurrent multi-system communications receiver that provides real signaling output.

FIG. 11 shows a receiver 1100 that utilizes the complex filtering and real signal combining described above with respect to receiver 500 for the case of single-ended signaling. Here, the received input signals are processed through the receiver 1100 as a differential signal as described with respect to receiver 500 in FIG. 5. As shown above with respect to FIG. 5, the output of the driver 240 is a real-domain differential voltage signal. This differential signal 240 is processed via an additional differential to single-ended conversion stage, here a differential to single-ended voltage converter 1120, which results in a single pin output to the baseband ADC.

Figure 12:
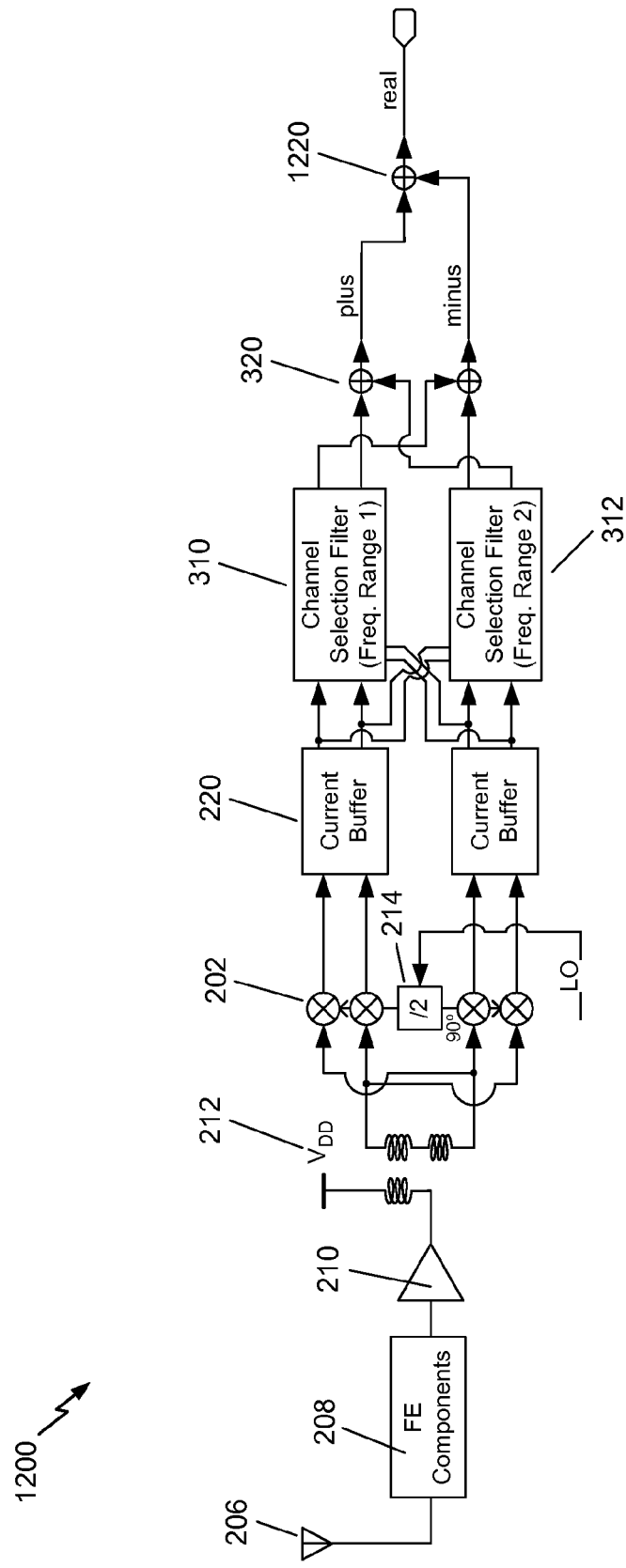

FIG. 12 shows a receiver 1200 that utilizes the complex filtering and real signal combining described above with respect to receiver 400 to provide single-ended output signaling. Here, after the signal combiner 320 operates on the outputs of the complex filters 310, 312 to produce a real-domain current signal, this signal is processed by a second signal combiner 1220 to obtain a single-ended real-domain current signal. This signal may be passed directly to baseband as a current signal as shown in FIG. 12, or alternatively the single-ended current signal may be passed through a TIA 330 (and optionally a driver 240) and sent to baseband as a voltage signal.

Figure 13:
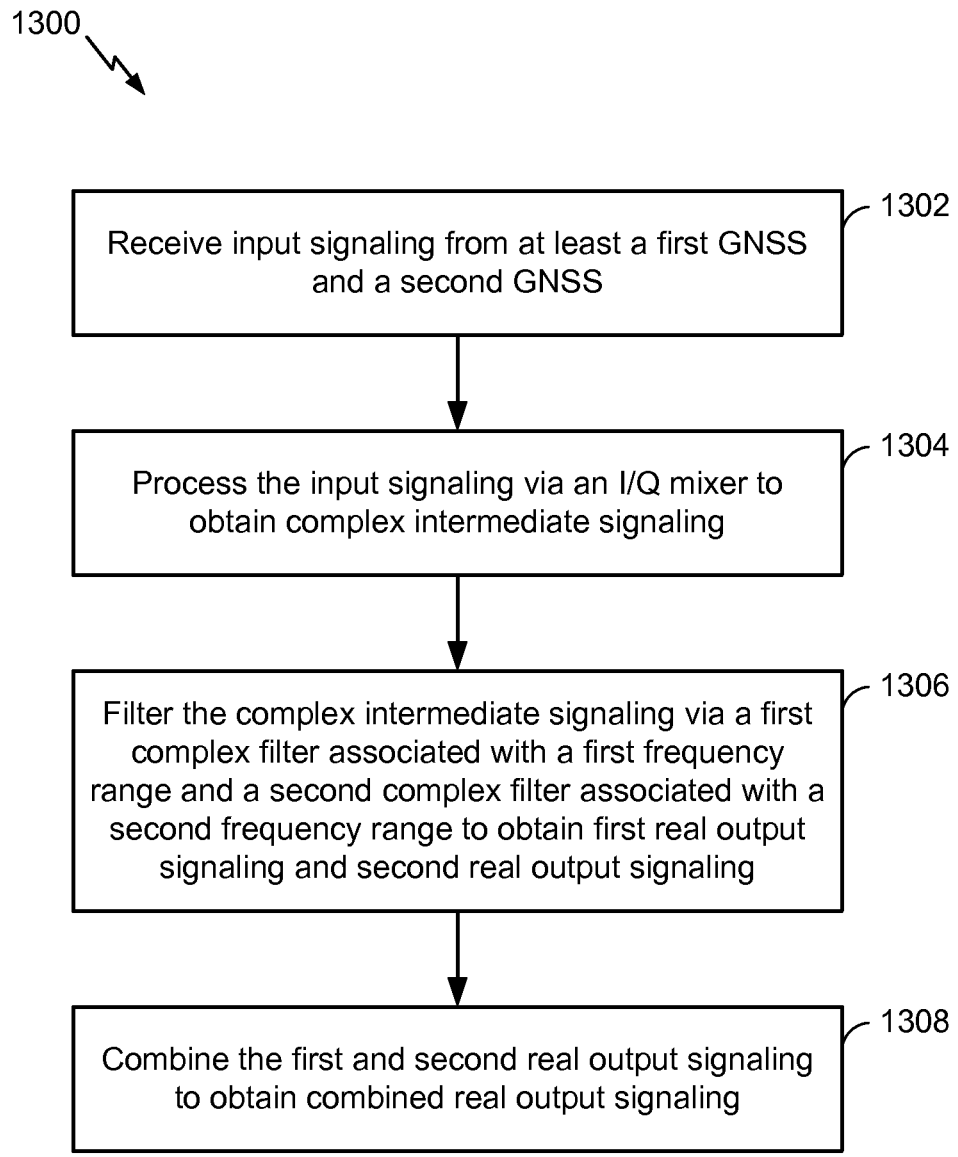
FIG. 13 is a block flow diagram of a process of processing GNSS signals.

Referring to FIG. 13, with further reference to FIGS. 1-12, a process 1300 of processing GNSS signals includes the stages shown. The process 1300 is, however, an example only and not limiting. The process 1300 can be altered, e.g., by having stages added, removed, rearranged, combined, and/or performed concurrently. Still other alterations to the process 1300 as shown and described are possible.

At stage 1302, input signaling is received (e.g., at a receiver 300, 400, 500 associated with a mobile device 100 or other device) from at least a first GNSS and a second GNSS. The first and second GNSSs may utilize satellite communication technologies that include, but are not limited to, GPS, Glonass, Beidou, etc. Additionally, the first and second GNSSs may be associated with different frequency bands or ranges, e.g., an L1 frequency band and an L2 frequency band. In general, the first and second GNSSs may utilize the same or different communication technologies and/or the same or different frequency bands (e.g., a GPS L1 band and a Glonass L1 band, a GPS L1 band and a GPS L2 band, etc.). The input signaling, as well as the signaling produced in the subsequent stages of the process 1300, may be either differential or single-ended signaling as described above.

At stage 1304, the input signaling obtained at stage 1302 is processed via an I/Q mixer 202. The result of this processing is common complex intermediate signaling for both systems from which input signaling is received. The complex intermediate signaling contains an I component and a Q component, as illustrated in FIGS. 2-6.

At stage 1306, the complex intermediate signaling obtained at stage 1304 is filtered via a first complex filter 310 and a second complex filter 312. Here, the first complex filter 310 is associated with a first frequency range and the second complex filter 312 is associated with a second frequency range. These frequency ranges are configured by selecting a LO frequency at which the first and second complex filters 310, 312 operate, as described above with respect to FIGS. 3-5. In particular, the LO frequency is chosen with respect to a system baseband frequency such that the frequency response of the outputs of the respective complex filters 310, 312 do not overlap at the system baseband frequency. As a result, the first frequency range and the second frequency range are situated on opposite sides of the system baseband frequency and are not imaged to each other. This frequency configuration enables the first complex filter 310 to provide a first rejection at the second frequency range and the opposite of the second frequency range with respect to the system baseband frequency (e.g., +x-y MHz and −x-y MHz relative to baseband for a second frequency range of x-y MHz), and further enables the second complex filter 312 to provide a second rejection at the first frequency range and the opposite of the first frequency range with respect to the system baseband frequency. The first rejection and second rejection are sufficiently large such that overlap between the outputs of the first and second complex filters 310, 312 in frequency falls below a predetermined threshold, the threshold in turn being determined as a function of a desired filter output signal quality.

At stage 1308, the first and second real output signaling produced by the first and second complex filters 310, 312 at stage 1306 are combined to obtain combined real output signaling. The first and second real output signaling produced at stage 1306 may be voltage signals (e.g., as shown in FIGS. 3, 5 and 11) or current signals (e.g., as shown in FIGS. 4 and 12). Upon combining and optional additional processing, the combined real output signaling is provided to a baseband processor and/or other entities which store and/or utilize the information contained in the received signals.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for processing global navigation satellite system (GNSS) signals, the method comprising:
    receiving input signaling from at least a first GNSS source and a second GNSS source;
    processing the input signaling via an in-phase (I)/quadrature (Q) mixer to obtain complex intermediate signaling;
    filtering the complex intermediate signaling via a first complex filter associated with a first frequency range and a second complex filter associated with a second frequency range, thereby obtaining first real output signaling and second real output signaling, respectively; and
    generating combined real output signaling by combining the first real output signaling and the second real output signaling wherein the combined real output signaling comprises only one of a combined I signal or a combined Q signal.

2. The method of claim 1 further comprising providing the combined real output signaling to a baseband signal processor.

3. The method of claim 2 comprising outputting the generated combined real output signaling to the baseband signal processor via a single pin.

4. The method of claim 1 wherein the first frequency range comprises a frequency range on which the input signaling is received from the first GNSS source and the second frequency range comprises a frequency range on which the input signaling is received from the second GNSS source.

5. The method of claim 4 wherein the first frequency range and the second frequency range are situated on opposite sides of a system baseband frequency and are not imaged to each other.

6. The method of claim 5 wherein the filtering comprises:
    providing at least a first level of rejection at the second frequency range and an opposite of the second frequency range with respect to the system baseband frequency via the first complex filter; and
    providing at least a second level of rejection at the first frequency range and an opposite of the first frequency range with respect to the system baseband frequency via the second complex filter.

7. The method of claim 6 further comprising defining the first level of rejection and the second level of rejection such that overlap in frequency between outputs of the first complex filter and the second complex filter is no more than a threshold, wherein the threshold is chosen as a function of a desired filter output signal quality.

8. The method of claim 5 wherein the filtering comprises configuring the first complex filter and the second complex filter to operate at a local oscillator (LO) frequency, wherein the LO frequency is chosen such that a frequency response of respective outputs of the first complex filter and the second complex filter do not overlap at the system baseband frequency.

9. The method of claim 1 wherein the combining comprises combining the first real output signaling and the second real output signaling in current to obtain combined current signaling.

10. The method of claim 9 wherein the method further comprises converting the combined current signaling to voltage signaling via a trans-impedance amplifier (TIA).

11. The method of claim 1 wherein the combining comprises:
    combining the first real output signaling and the second real output signaling to obtain differential output signaling; and
    converting the differential output signaling to single-ended output signaling.

12. The method of claim 1 wherein the first GNSS source is associated with a first communication technology and the second GNSS source is associated with a second communication technology.

13. The method of claim 12 wherein the first communication technology comprises Global Positioning System (GPS) and the second communication technology comprises Glonass.

14. The method of claim 1 wherein the first GNSS source is associated with a first frequency band and the second GNSS source is associated with a second frequency band.

15. The method of claim 14 wherein the first frequency band comprises an L1 frequency band and the second frequency band comprises an L2 frequency band.

16. A concurrent multi-system global navigation satellite system (GNSS) receiver, the receiver comprising:
   at least one GNSS antenna configured to receive input signaling from at least a first GNSS source and a second GNSS source;
   an in-phase (I)/quadrature (Q) mixer communicatively coupled to the at least one GNSS antenna and configured to process the input signaling to obtain complex intermediate signaling;
   a first complex filter communicatively coupled to the I/Q mixer and configured to filter the complex intermediate signaling with respect to a first frequency range to obtain first real output signaling;
   a second complex filter communicatively coupled to the I/Q mixer and configured to filter the complex intermediate signaling with respect to a second frequency range to obtain second real output signaling; and
   a signal combiner communicatively coupled to the first complex filter and the second complex filter and configured to generate combined real output signaling by combining the first real output signaling and the second real output signaling wherein the combined real output signaling comprises only one of a combined I signal or a combined Q signal.

17. The receiver of claim 16 wherein the signal combiner is communicatively coupled to a baseband signal processor and configured to provide the combined real output signaling to the baseband signal processor.

18. The receiver of claim 16 wherein the first frequency range comprises a frequency range on which the input signaling is received from the first GNSS source and the second frequency range comprises a frequency range on which the input signaling is received from the second GNSS source.

19. The receiver of claim 18 wherein the first frequency range and the second frequency range are situated on opposite sides of a system baseband frequency and are not imaged to each other.

20. The receiver of claim 19 wherein:
   the first complex filter is configured to provide at least a first level of rejection at the second frequency range and an opposite of the second frequency range with respect to the system baseband frequency; and
   the second complex filter is configured to provide at least a second level of rejection at the first frequency range and an opposite of the first frequency range with respect to the system baseband frequency.

21. The receiver of claim 20 wherein the first level of rejection and the second level of rejection are defined such that overlap in frequency between outputs of the first complex filter and the second complex filter is no more than a threshold, wherein the threshold is chosen as a function of a desired filter output signal quality.

22. The receiver of claim 19 wherein the first complex filter and the second complex filter are configured to operate with respect to a local oscillator (LO) frequency, wherein the LO frequency is chosen such that a frequency response of respective outputs of the first complex filter and the second complex filter do not overlap at the system baseband frequency.

23. The receiver of claim 16 wherein the signal combiner is further configured to generate combined output current signaling by combining the first real output signaling and the second real output signaling.

24. The receiver of claim 23 further comprising a trans-impedance amplifier (TIA) communicatively coupled to the signal combiner and configured to convert the combined output current signaling to combined output voltage signaling.

25. The receiver of claim 16 wherein:
   the signal combiner is further configured to generate differential output signaling by combining the first real output signaling and the second real output signaling; and
   the receiver further comprises a conversion stage communicatively coupled to the signal combiner and configured to convert the differential output signaling to single-ended output signaling.

26. The receiver of claim 25 wherein:
   the differential output signaling is a differential current signal;
   the receiver further comprises a trans-impedance amplifier (TIA) communicatively coupled to the signal combiner and configured to convert the differential current signal to a differential voltage signal; and
   the conversion stage comprises a voltage converter configured to convert the differential voltage signal into a single-ended voltage signal.

27. The receiver of claim 25 wherein:
   the differential output signaling is a differential current signal; and
   the conversion stage comprises a current combiner configured to convert the differential current signal into a single-ended current signal.

28. The receiver of claim 16 wherein the first GNSS source is associated with a first communication technology and the second GNSS source is associated with a second communication technology.

29. The receiver of claim 16 wherein the first GNSS source is associated with a first frequency band and the second GNSS source is associated with a second frequency band.

30. An apparatus for receiving global navigation satellite system (GNSS) signals, the apparatus comprising:
   at least one GNSS antenna configured to receive input signaling from at least a first GNSS source and a second GNSS source;
   an in-phase (I)/quadrature (Q) mixer communicatively coupled to the at least one GNSS antenna and configured to process the input signaling to obtain complex intermediate signaling;
   means for filtering the complex intermediate signaling with respect to a first frequency range and a second frequency range, thereby generating first real output signaling and second real output signaling, respectively, the means for filtering being communicatively coupled to the I/Q mixer; and
   means for generating combined real output signaling by combining the first real output signaling and the second real output signaling wherein the combined real output signaling comprises only one of a combined I signal or a combined Q signal, the means for generating being communicatively coupled to the means for filtering.

31. The apparatus of claim 30 wherein the means for combining is communicatively coupled to a baseband signal processor and comprises means for providing the combined real output signaling to the baseband signal processor.

32. The apparatus of claim 30 wherein the first frequency range comprises a frequency range on which the input signaling is received from the first GNSS source and the second frequency range comprises a frequency range on which the input signaling is received from the second GNSS source.

33. The apparatus of claim 32 wherein the first frequency range and the second frequency range are situated on opposite sides of a system baseband frequency and are not imaged to each other.

34. The apparatus of claim 33 wherein the means for filtering comprises:
 means for generating the first real output signaling by providing at least a first level of rejection at the second frequency range and an opposite of the second frequency range with respect to the system baseband frequency; and
 means for generating the second real output signaling by providing at least a second level of rejection at the first frequency range and an opposite of the first frequency range with respect to the system baseband frequency.

35. The apparatus of claim 34 wherein the first level of rejection and the second level of rejection are defined such that overlap between outputs of first and second complex filters in frequency is no more than a threshold, wherein the threshold is chosen as a function of a desired filter output signal quality.

36. The apparatus of claim 34 wherein the means for filtering operates with respect to a local oscillator (LO) frequency, and wherein the LO frequency is chosen such that a frequency response of the output of the means for generating the first real output signaling and a frequency response of the output of the means for generating the second real output signaling do not overlap at the system baseband frequency.

37. The apparatus of claim 30 wherein the means for filtering comprises a first complex filter and a second complex filter, wherein the first complex filter is configured to generate the first real output signaling and the second complex filter is configured to generate the second real output signaling.

38. The apparatus of claim 30 wherein the combined real output signaling comprises output current signaling.

39. The apparatus of claim 38 further comprising a transimpedance amplifier (TIA) communicatively coupled to the means for combining and configured to convert the output current signaling to voltage signaling.

40. The apparatus of claim 30 wherein the means for combining comprises:
 means for combining the first real output signaling and the second real output signaling to obtain differential output signaling; and
 means for converting the differential output signaling to single-ended output signaling.

41. The apparatus of claim 30 wherein the first GNSS source is associated with a first communication technology and the second GNSS source is associated with a second communication technology.

42. The apparatus of claim 30 wherein the first GNSS source is associated with a first frequency band and the second GNSS source is associated with a second frequency band.

* * * * *